Dec. 22, 1953  J. MARINELLI  2,663,319
SOLENOID OPERATED PILOT VALVE AND MAIN VALVE
Filed May 11, 1949

INVENTOR.
JOSEPH MARINELLI
BY
ATTORNEY.

Patented Dec. 22, 1953

2,663,319

UNITED STATES PATENT OFFICE 2,663,319

SOLENOID OPERATED PILOT VALVE AND MAIN VALVE

Joseph Marinelli, Orange, N. J., assignor to Bendix Aviation Corporation, Teterboro, N. J., a corporation of Delaware Application May 11, 1949, Serial No. 92,543

3 Claims. (Cl. 137—657)

The valve invention relates to a solenoid operated valve of the type particularly adapted for use in fire extinguishing systems.

The device is particularly utile in the fire extinguishing system of an airplane or other craft where it is desired to control the system from some convenient point, such as a switch panel, and selectively determine at which point or points on the craft the extinguisher, generally carbon dioxide, shall be discharged, depending upon the requirements of the situation.

Similar devices of the prior art have been employed to control the flow of the extinguisher fluid in an aircraft fire extinguishing system, but these have generally been of heavier weight and larger dimensions for a rate of flow comparable to that delivered by the instant device, and have additionally penalized the aircraft by requiring specially designed mounting brackets, and the reinforcing of surrounding structure, all to the detriment of the craft.

It is therefore one of the objects of the present invention to provide a solenoid operated valve for use in aircraft fire extinguishing systems or the like, wherein the foregoing disadvantages are eliminated, and to do so by novel and effective means.

Another object of the invention is to provide a valve for the fire extinguishing system of a craft, a number of which may be conveniently installed at several points in the craft and the operation thereof selectively controlled from a central point.

Another object of the invention is to provide a solenoid operated valve for an aircraft fire extinguishing system with a high rate of flow, yet smaller and lighter than similar valves heretofore.

Still another object of the invention is to provide a valve of the above indicated nature which will deliver the extinguisher fluid at an extremely high pressure.

A further object of the invention is to provide a novel fire extinguishing system valve whose operation will be positive and practically instantaneous.

Another object of the invention is to provide a valve of the above-indicated nature which will be simple and economical to manufacture with a minimum of machined parts, and easy and convenient to install.

The foregoing and other objects and advantages will appear more fully hereinafter from a consideration of the detailed description which follows, taken together with the accompanying drawing, wherein one embodiment of the invention is illustrated by way of example.

It is to be expressly understood, however, that the drawing is for the purposes of illustration only, and is not to be construed as defining the limits of the invention, reference being had for this purpose to the appended claims.

Referring to the drawing wherein like reference characters designate like parts throughout two views.

Figure 1:
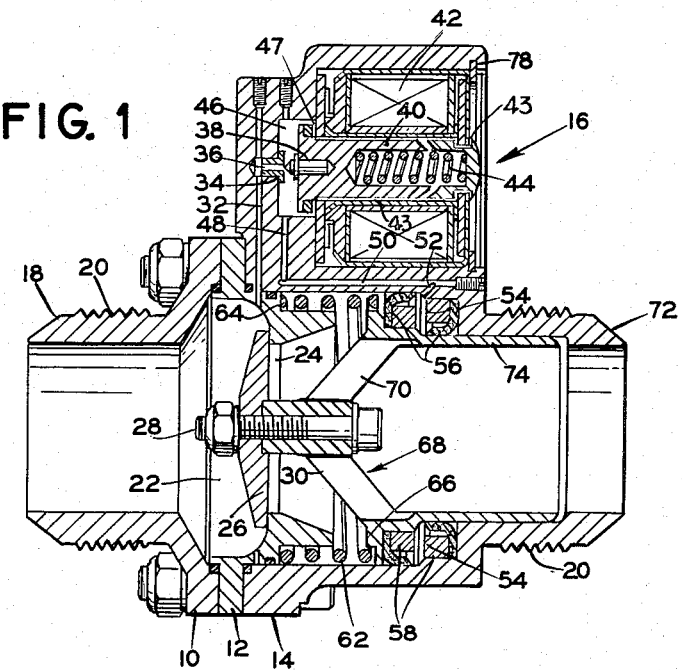
Figure 1 is an elevation in section taken along the line 1—1 of Figure 2.

Referring now to Figure 1, a member 10 is bolted to an intermediate annular member 12 and a housing 14 to form a complete housing assembly generally indicated by the arrow 16.

An inlet port 18, in the member 10, the exterior of which is equipped with standard threads 20 for a tube connection, communicates with a chamber 22, the throat 24 of which is normally closed by a cap 26 attached by bolt and nut means 28 to the main piston assembly 30.

A passage 32 leads from the chamber 22 to a bushing 34 containing orifice 36 communicating with the passage 32. The orifice 36 is normally closed by a tapered pin 38 attached to a plunger 40 of a solenoid 42, and so held by the force of a solenoid spring 44.

A pilot chamber 46, on the opposite side of the bushing 34, communicates through successive passages 48, 50 and 52 with an annular main pressure chamber 54. The main pressure chamber 54 is enclosed by a low friction material, such as leather seals 56, secured in place by pressed rings 58. One of the seals 56 and its associated ring 58 are positioned to abut an angular flange on the piston assembly 30 and thus forms an annular working head for the piston assembly as well as one wall of the pressure chamber 54. The outside diameter of this working head is substantially greater than the effective diameter of the cap 26, while the inside diameter of the working head and the effective diameter of the cap 26 are approximately equal. Therefore, the effective pressure area of the working head of the piston assembly 30 located in the chamber 54 is greater than the effective area of the cap 26 for purposes hereinafter set forth.

Figure 2:
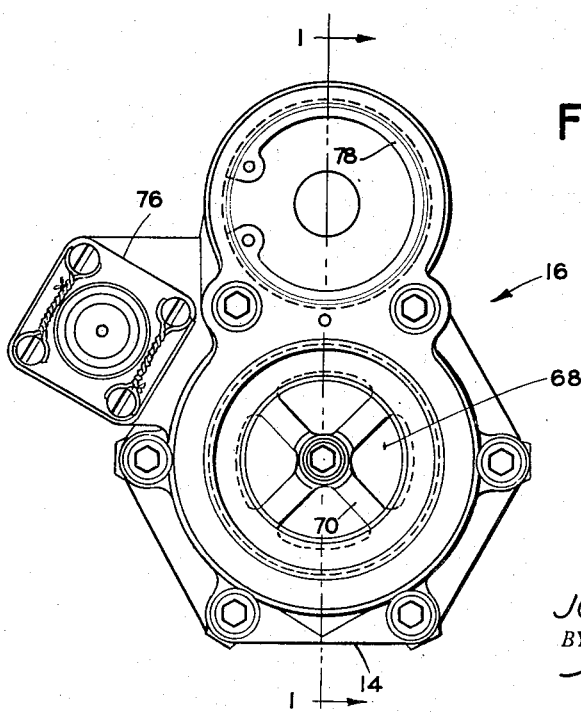
Figure 2 is an end view of the device.

A spring 62, acting against a flange 64 of the intermediate member 12, and shoulder 66 of the piston assembly 30, biases the cap 26 toward normally closed position. Passages 68 between webs 70 (Figure 2) of the piston assembly 30 permit through flow of an outlet 72 upon opening of the valve cap 26. A cylindrical sleeve 74 extending interiorly of the outlet port 72 serves to guide the movement of the piston assembly. An electrical receptacle 76 (Figure 2) of a type well known to the art attaches to the main housing 14 to receive the electrical wires to the solenoid 42. A snap ring 78 secures the solenoid 42 firmly within the housing 14.

Having thus described the invention, in operation, it will now be apparent to those skilled in the art that when an extinguisher fluid, such as carbon dioxide, is admitted into the valve through the inlet port 18, it will flow into the chamber 22 and act on the effective area of the cap 26 to further maintain the cap in a firmly closed position, and simultaneously flow through the passage 32 to the orifice 36, and there, be arrested by the tapered pin 38. When the pin 38 is seated on the orifice 36, an annular passageway 47 is defined between the head of plunger 40 and the inner end wall of the solenoid 42. Thus, any leakage of carbon dioxide past the seated pin 38 into the pilot chamber 46 is vented into the atmosphere through a normal clearance space indicated by numeral 43 between the solenoid plunger 40 and the solenoid 42. As shown in Fig. 1, the normal clearance space between solenoid plunger 40 and solenoid 42 has been enlarged for purposes of clarity. When, however, to operate the valve, the solenoid 42 is energized, the solenoid plunger 40 will move to the right, thereby unseating the pin 38, and causing the fluid to pass into and pressurize the pilot chamber 46. The fluid pressure acting against the solenoid plunger 40 will press the head thereof into contact with the inner end wall of the solenoid 42, thereby in effect eliminating the passage 47 and hermetically sealing the pilot chamber 46 from the atmosphere. Moreover, the pin 38 will be kept unseated for as long as the fluid supply lasts. The extinguisher fluid hence passes through the passages 48, 50 and 52, thereby gaining ingress to the main pressure chamber 54. Since the area of the working head of the piston assembly 30 is greater than the effective area of cap 26, the pressure within the chamber 54 produces an effective force acting towards unseating the cap 26 that is greater than the effective force acting on the inlet side of the cap 26, and therefore the piston assembly 30 will instantaneously be pushed towards the left, easily overcoming the force of spring 62 and the pressure acting on the effective area on the inlet side of cap 26 and thereby unseating cap 26 to permit the extinguisher fluid to flow past the throat 24, through the passages 68 of the piston assembly 30, and out through the outlet 72. The sleeve 74 guides the movement of the piston assembly and serves to prevent jamming or twisting thereof. The soft leather seals 56 reduce the friction to a minimum, and further, insure smooth and rapid movement of the piston.

The generally neat and compact arrangement of the valve, and the relatively large diameter in-line inlet and outlet, compared to the casing size, and the large diameter of throat 24, make for a lighter and smaller valve than similar devices, but with an approximately equal rate of flow, and at very high pressure, since the pressure across the valve is close to system pressure due to the large diameter of the inlet and outlet and of the throat 24.

However the effective surface area of the working head of the piston assembly 30 is sufficiently great that the fluid pressure in chamber 54 acting thereon produces a force tending to maintain the cap 26 unseated. The latter force exceeds the force produced by the downstream pressure acting on the sleeve 74 and tending to seat the valve 26 by an amount sufficient to overcome the bias of spring 62 and the kinetic energy of the flowing fluid acting on cap 26. Thus after the opening of the valve cap 26 the same is maintained in an open position by virtue of the force of the fluid pressure acting on the effective surface area of the working head of the piston assembly 30.

Due to the compactness and lightness of the device, it is adapted to be mounted in a structurally satisfactory manner by its own connecting tubing, not shown here, and thereby dispense with specially designed mounting brackets and supports.

There is thus provided a valve for use in a fire extinguishing system, of positive and reliable operation, which is small in size and light in weight, with a high rate of flow, and which will deliver the extinguisher fluid instantaneously at high pressure, and still is simple and economical to manufacture and easy to install.

Although only one embodiment of the invention has been illustrated and described, other changes and modifications in form and relative arrangement of parts, which will be apparent to those skilled in the art, may be made without departing from the spirit and scope of the invention.

What is claimed is:

1. The combination comprising a member providing a fluid inlet, an intermediate member forming a throat, and a housing including a pilot chamber and a fluid outlet attached to said first member and intermediate member to form an aligned passage, a piston assembly concentric with said outlet and slideably guided therein, a cap at one end of said piston assembly normally closing said throat and having an inlet side face, a concentric spring acting against said piston assembly and biasing said cap to a closed position, a passage from said fluid inlet to said pilot chamber, a solenoid, a pin attached to said solenoid, said pin arranged to close said passage to said pilot chamber, passageway means from said pilot chamber bypassing said throat, an annular pressure chamber concentric about said piston assembly and outlet and open to said passageway means, a flange on said piston assembly of greater area than the inlet side face of said cap and forming a wall of said pressure chamber, said solenoid upon operation unseating said pin and admitting fluid into said pilot chamber and annular chamber to affect said flange so as to overcome said spring and actuate said piston assembly to open said throat.

2. In combination a member providing a fluid inlet, an intermediate member containing a throat, and a main housing including a pilot chamber and a fluid outlet attached to said first member and intermediate member to form an aligned fluid passage, a piston assembly slideably guided within said outlet and extending into said intermediate member, a valve member at one end of said piston assembly to normally close said throat, spring means biasing said piston assembly and thereby said valve member to a closed position, a fluid passage from the inlet to said pilot chamber, a solenoid, a pin responsive to said solenoid, said pin arranged to close said passage to said pilot chamber, a second passage from said pilot chamber, an annular pressure chamber concentric about said piston assembly and including a wall formed by said piston, said pressure chamber open to said second passage, said solenoid upon operation unseating said pin and admitting fluid into said pressure chamber to actuate said piston assembly and open said throat, thereby permitting flow through said aligned fluid passage.

3. A solenoid actuated valve comprising a member forming a fluid inlet, an intermediate member having a throat therein, a housing including a pilot chamber, and an outlet, said inlet and throat members being associated with said housing and forming with the outlet thereof an aligned passage through said valve, a piston assembly slidably mounted in said outlet and forming a part of said aligned passage, a cap on said piston adjacent said throat, resilient means biasing said cap to close the throat in the intermediate member, an annular pressure chamber concentric with and formed in part by said piston assembly, a first fluid conduit between said inlet and the pilot chamber, a solenoid, a solenoid plunger responsive to said solenoid and having a pin arranged to close communication between said first fluid conduit and said pilot chamber, means for placing said pilot chamber in communication with the exterior of the valve, means to close communication between said pilot chamber and the exterior of the valve, and a second fluid conduit between said pilot chamber and said annular pressure chamber.

JOSEPH MARINELLI.

References Cited in the file of this patent

UNITED STATES PATENTS

| Number | Name | Date |
|---|---|---|
| 452,942 | Slater | May 26, 1891 |
| 624,890 | Batchelor | May 9, 1899 |
| 746,337 | Jungren | Dec. 8, 1903 |
| 1,339,114 | Larner | May 4, 1920 |
| 1,806,925 | Trapper | May 26, 1931 |
| 1,908,504 | Bone | May 9, 1933 |
| 2,097,201 | Renkenberger | Oct. 26, 1937 |
| 2,102,076 | Johnson | Dec. 14, 1937 |
| 2,129,938 | Johnson | Sept. 13, 1938 |
| 2,205,033 | Dreyer | June 18, 1940 |
| 2,435,162 | Scott | Jan. 27, 1948 |
| 2,537,051 | Grant | Jan. 9, 1951 |